(12) United States Patent
Cox et al.

(10) Patent No.: US 11,626,711 B2
(45) Date of Patent: *Apr. 11, 2023

(54) ELECTRICAL POWER SUPPLY STRUCTURES

(71) Applicant: Superior Tray Systems Inc., Delta (CA)

(72) Inventors: Martin Cox, Surrey (CA); Parry Singh Mudhar, Vancouver (CA); Tuan Anh Nguyen, Vancouver (CA); Vladislav Leder, Richmond (CA)

(73) Assignee: Superior Tray Systems Inc., Delta (CA)

( * ) Notice: Subject to any disclaimer, the term of this patent is extended or adjusted under 35 U.S.C. 154(b) by 146 days.

This patent is subject to a terminal disclaimer.

(21) Appl. No.: 17/248,433

(22) Filed: Jan. 25, 2021

(65) Prior Publication Data

US 2021/0143616 A1     May 13, 2021

Related U.S. Application Data

(63) Continuation of application No. 16/880,689, filed on May 21, 2020, now Pat. No. 10,903,630, which is a
(Continued)

(30) Foreign Application Priority Data

May 2, 2017 (CA) .................................. CA 2965823

(51) Int. Cl.
*H02G 3/08* (2006.01)
*H02G 3/22* (2006.01)
(Continued)

(52) U.S. Cl.
CPC ................ *H02B 1/20* (2013.01); *E04B 5/48* (2013.01); *H01B 9/02* (2013.01); *H02B 1/46* (2013.01);
(Continued)

(58) Field of Classification Search
CPC . H02B 1/20; H02B 1/46; H02B 1/305; H02B 1/202; H02B 1/26; H01B 9/02;
(Continued)

(56) References Cited

U.S. PATENT DOCUMENTS 4,291,195 A    9/1981   Blomqvist et al.
4,376,230 A    3/1983   Bargsten
(Continued)

FOREIGN PATENT DOCUMENTS

WO        9953584 A1    10/1999
WO    2006076746 A1    7/2006
(Continued)

OTHER PUBLICATIONS

Office Action dated Jan. 2, 2019, issued by the USPTO on related U.S. Appl. No. 15/847,046.
(Continued)

*Primary Examiner* — Angel R Estrada
(74) *Attorney, Agent, or Firm* — Dentons Canada LLP (57) ABSTRACT

The present disclosure provides an electrical power supply structure comprising a plurality of insulated pipes, each insulated pipe extending longitudinally and configured to carry high amperage electrical power, a barrier support plate comprising one or more openings for receiving the plurality of insulated pipes, the barrier support plate configured for mounting over a hole through a floor of a building, a first support structure extending longitudinally upward from an upper side of the barrier support plate, and a second support structure extending longitudinally downward from a lower side of the barrier support plate through the hole. Each of the first and second support structures comprises a longitudinally extending enclosure having a plurality of transversely
(Continued)

extending conductor support members for supporting the plurality of insulated pipes, and the plurality of insulated pipes are grouped by phase.

10 Claims, 9 Drawing Sheets

Related U.S. Application Data continuation of application No. 16/720,700, filed on Dec. 19, 2019, now Pat. No. 10,693,282, which is a continuation of application No. 16/381,911, filed on Apr. 11, 2019, now Pat. No. 10,554,024, which is a continuation of application No. 15/847,046, filed on Dec. 19, 2017, now Pat. No. 10,305,263.

(51) Int. Cl.
  *H02B 1/20* (2006.01)
  *H02G 3/04* (2006.01)
  *H02G 3/34* (2006.01)
  *E04B 5/48* (2006.01)
  *H01B 9/02* (2006.01)
  *H02B 1/46* (2006.01)
  *H02B 1/30* (2006.01)
  *H02G 3/32* (2006.01)
  *H02G 5/06* (2006.01)
  *H02G 5/08* (2006.01)

(52) U.S. Cl.
  CPC ............. *H02G 3/0431* (2013.01); *H02G 3/22* (2013.01); *H02G 3/34* (2013.01); *H02B 1/305* (2013.01); *H02G 3/0412* (2013.01); *H02G 3/0456* (2013.01); *H02G 3/32* (2013.01); *H02G 5/06* (2013.01); *H02G 5/08* (2013.01)

(58) Field of Classification Search
  CPC .......... H01B 9/00; H02G 3/0431; H02G 3/22; H02G 3/34; H02G 3/0412; H02G 3/0456; H02G 3/32; H02G 5/06; H02G 3/08; H02G 3/081; H02G 5/08; E04B 5/48
  USPC .......... 174/50, 68.1, 68.3, 72 A, 135, 149 R; 248/56, 68.1, 74.1, 74.2; 385/134, 135; 52/220.1, 220.3, 220.7, 220.8; 312/223.1, 312/223.2, 223.6; 361/624

See application file for complete search history.

(56) References Cited

U.S. PATENT DOCUMENTS

| | | |
|---|---|---|
| 4,702,444 A | 10/1987 | Beele |
| 4,767,086 A | 8/1988 | Blomqvist |
| 5,391,840 A | 2/1995 | Hughes et al. |
| 5,665,939 A | 9/1997 | Jorgensen et al. |
| 5,992,802 A | 11/1999 | Campbell |
| 6,590,154 B1 | 7/2003 | Badey et al. |
| 6,706,969 B1 | 3/2004 | Young |
| 7,477,500 B2 | 1/2009 | Schmidt et al. |
| RE42,266 E | 4/2011 | Sparrowhawk |
| 8,193,448 B2 | 6/2012 | Syed |
| 8,294,030 B2 | 10/2012 | Pollard, Jr. |
| 9,059,575 B2 | 6/2015 | Pawluk |
| 10,305,263 B2 | 5/2019 | Cox et al. |
| 10,554,024 B2 | 2/2020 | Cox et al. |
| 10,693,282 B2 | 6/2020 | Cox et al. |
| 10,903,630 B2 * | 1/2021 | Cox .................. H02B 1/46 |
| 2015/0255967 A1 | 9/2015 | Pawluk |
| 2016/0050782 A1 | 2/2016 | Englert et al. |

FOREIGN PATENT DOCUMENTS

| | | |
|---|---|---|
| WO | 2006097600 A1 | 9/2006 |
| WO | 2007006961 A1 | 1/2007 |
| WO | 2011146567 A2 | 11/2011 |
| WO | 2013142874 A1 | 9/2013 |

OTHER PUBLICATIONS

Office Action dated May 14, 2019, issued by the USPTO on related U.S. Appl. No. 16/381,911.

Examiner's Report dated Apr. 30, 2020, issued by the Canadian Intellectual Property Office on related Canadian patent application No. 2,965,823.

Examiner's Report dated Dec. 3, 2020, issued by the Canadian Intellectual Property Office on related Canadian patent application No. 2,965,823.

* cited by examiner

ELECTRICAL POWER SUPPLY STRUCTURES

CROSS REFERENCE TO RELATED APPLICATIONS

This application is a continuation of U.S. patent application Ser. No. 16/880,689 filed on May 21, 2020, which is a continuation of U.S. patent application Ser. No. 16/720,700 filed on Dec. 19, 2019, which is a continuation of U.S. patent application Ser. No. 16/381,911 filed on Apr. 11, 2019, which is a continuation of U.S. patent application Ser. No. 15/847,046 filed on Dec. 19, 2017, which in turn claims the benefit of priority of Canadian Patent Application No. 2,965,823 filed on May 2, 2017. U.S. patent application Ser. No. 16/880,689, U.S. patent application Ser. No. 16/720,700, U.S. patent application Ser. No. 16/381,911, U.S. patent application Ser. No. 15/847,046 and Canadian Patent Application No. 2,965,823 are hereby incorporated herein by reference in their entirety.

TECHNICAL FIELD

The present disclosure relates to distribution of electrical power within multi-story buildings.

BACKGROUND

In multi-story structures such as office towers, condominiums, apartments, and other buildings, electrical power is typically distributed with the use of bus ducts which run vertically through multiple floors of the building. At various points along a vertical bus duct, connection points such as bus plugs are needed to tie in cables that distribute power throughout each floor. Depending on power requirements, construction details, and other factors at play in a building a bus duct may have connection points on every floor, every other floor, or any other desired pattern.

Existing bus ducts are typically expensive and time consuming to install and replace. A typical bus duct has a number of rigid conductors, and these conductors must be securely connected at a joint between adjacent bus duct sections, often with a blade-type connection with bolts used to squeeze the conductors together. Such joints can present relatively high resistance, and some jurisdictions require that the bolts in the joints of a bus duct be re-torqued every six months. Further, due to seismic considerations, rigid bus ducts must typically be installed with their longer lateral sides oriented perpendicularly to a structural wall, such that the area footprint required for the bus duct can be significantly larger than the cross-sectional area of the bus duct itself.

The inventors have determined a need for improved structures and systems for distribution of electrical power in multi-story buildings.

SUMMARY

One aspect of the present disclosure provides an electrical power supply structure comprising a plurality of insulated pipes, each insulated pipe extending longitudinally and configured to carry high amperage electrical power, a barrier support plate comprising one or more openings for receiving the plurality of insulated pipes, the barrier support plate configured for mounting over a hole through a floor of a building, a first support structure extending longitudinally upward from an upper side of the barrier support plate, and a second support structure extending longitudinally downward from a lower side of the barrier support plate through the hole. Each of the first and second support structures comprises a longitudinally extending enclosure having a plurality of transversely extending conductor support members for supporting the plurality of insulated pipes, and the plurality of insulated pipes are grouped by phase.

The electrical power supply structure may comprise a spacer block having an opening sized to fit an outer dimension of one of the first and second support structures and configured to be mounted between the barrier support plate and a floor of a building such that the barrier support plate is held at a predetermined height above the floor. The insulated pipes in each group may be arranged in a circular arrangement. The electrical power supply structure may comprise shielding between groups of insulated pipes of different phases.

Another aspect of the present disclosure provides an electrical power distribution system for a high-rise building with a plurality of floors. The system comprises a plurality of electrical power supply structures arranged in a vertical stack, each electrical power supply structure comprising a plurality of insulated pipes extending longitudinally and configured to carry high amperage electrical power, a barrier support plate comprising one or more openings for receiving the plurality of insulated pipes, a first support structure extending longitudinally from a first side of the barrier support plate, and a second support structure extending longitudinally from a second side of the barrier support plate, each of the first and second support structures comprising a longitudinally extending enclosure having a plurality of transversely extending conductor support members for supporting the plurality of insulated pipes, wherein the plurality of insulated pipes are grouped by phase, and a plurality of tap boxes for connecting the plurality of electrical supply structures, each tap box connected between two adjacent electrical power supply structures and comprising a bus bar for each phase of electrical power, the bus bar having a first end for connecting the insulated pipes carrying that phase of electrical power in an upper one of the two adjacent electrical power supply structures, and a second end for connecting to the insulated pipes carrying that phase of electrical power in a lower one of the two adjacent electrical power supply structures.

The lengths of the first and second support structures of each of the electrical power supply structures may be selected such that each of the tap boxes is positioned at a predetermined height above one of the plurality of floors of the high-rise building. The insulated pipes in each group may be arranged in a circular arrangement. The electrical power supply structure may comprise shielding between groups of insulated pipes of different phases. Each electrical power supply structure may comprise a spacer block having an opening sized to fit an outer dimension of one of the first and second support structures and configured to be mounted between the barrier support plate and a floor of the high-rise building.

Another aspect of the present disclosure provides a vertical bus for delivering high amperage electrical power, comprising a supporting structure extending in a longitudinal direction and defining an enclosure, one or more shielding members extending within the supporting structure in the longitudinal direction and dividing the enclosure into two or more longitudinal chambers, and a plurality of conductor support members extending in a transverse direction across the supporting structure, the plurality of conductor support members being longitudinally spaced apart along a length of the supporting structure, and each cable support member comprising a plurality of holders arranged in a plurality of groups, each group located within one of the longitudinal chambers, such that the conductor support members support insulated pipes carrying multiphase electrical power and comprising a plurality of insulated pipes for each phase of electrical power.

Further aspects and details of example embodiments are set forth below.

DRAWINGS

The following figures set forth embodiments in which like reference numerals denote like parts. Embodiments are illustrated by way of example and not by way of limitation in the accompanying figures.

DETAILED DESCRIPTION

The following describes structures for supplying electrical power among multiple floors of a building. Example embodiments described below provide structures comprising vertical conductor sections and tap boxes that may be rapidly and securely connected to facilitate installation.

For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

Figure 1:
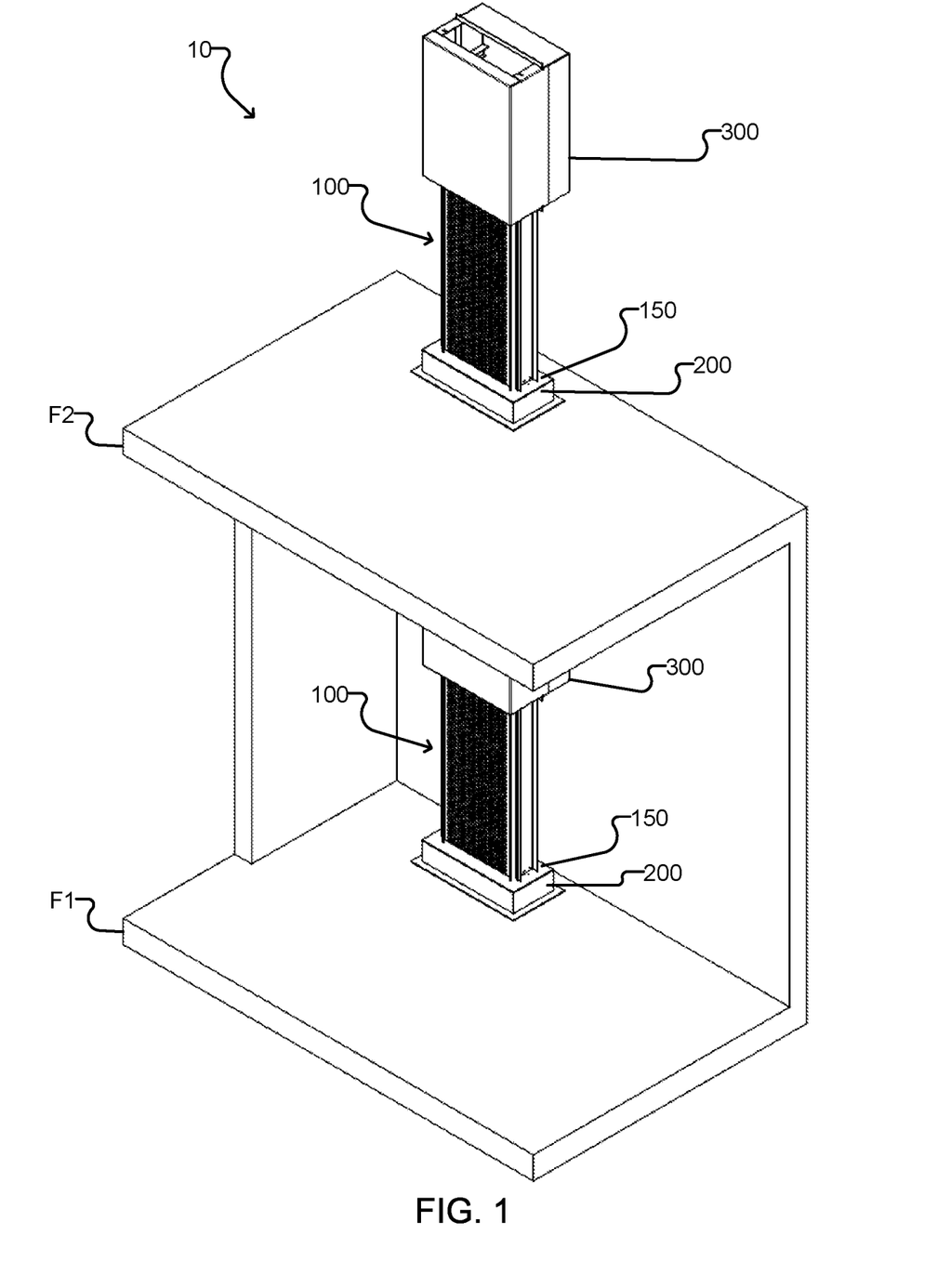
FIG. 1 shows a portion of an example electrical power supply structure installed between two floors of a building according to one embodiment of the present disclosure.
Figure 2:
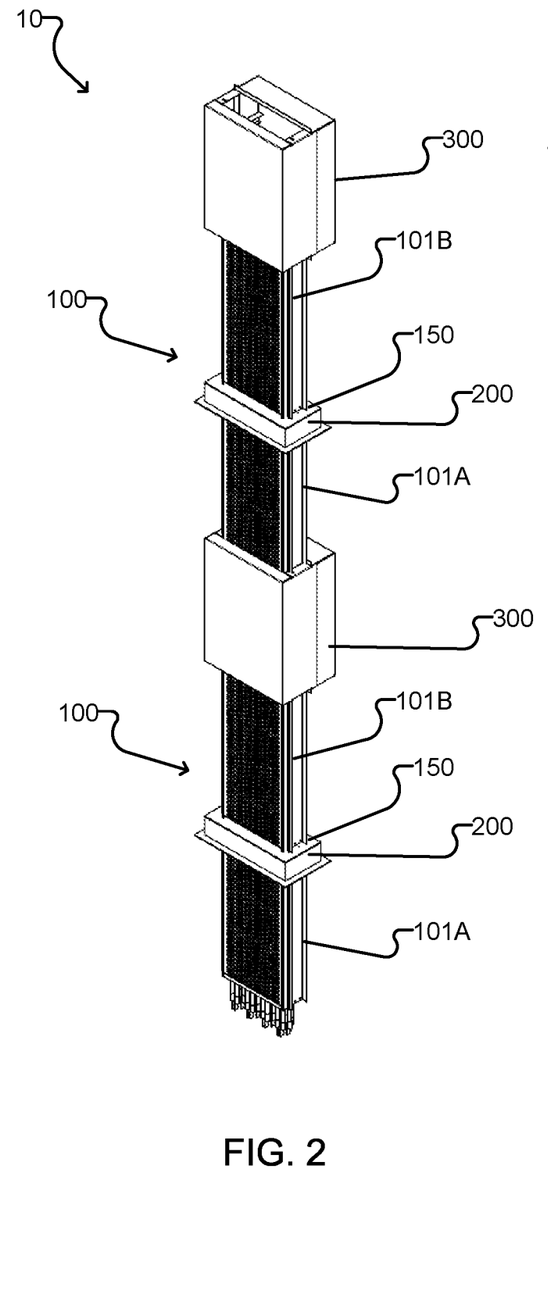
FIG. 2 shows the structure of FIG. 1 in isolation.
Figure 2A:
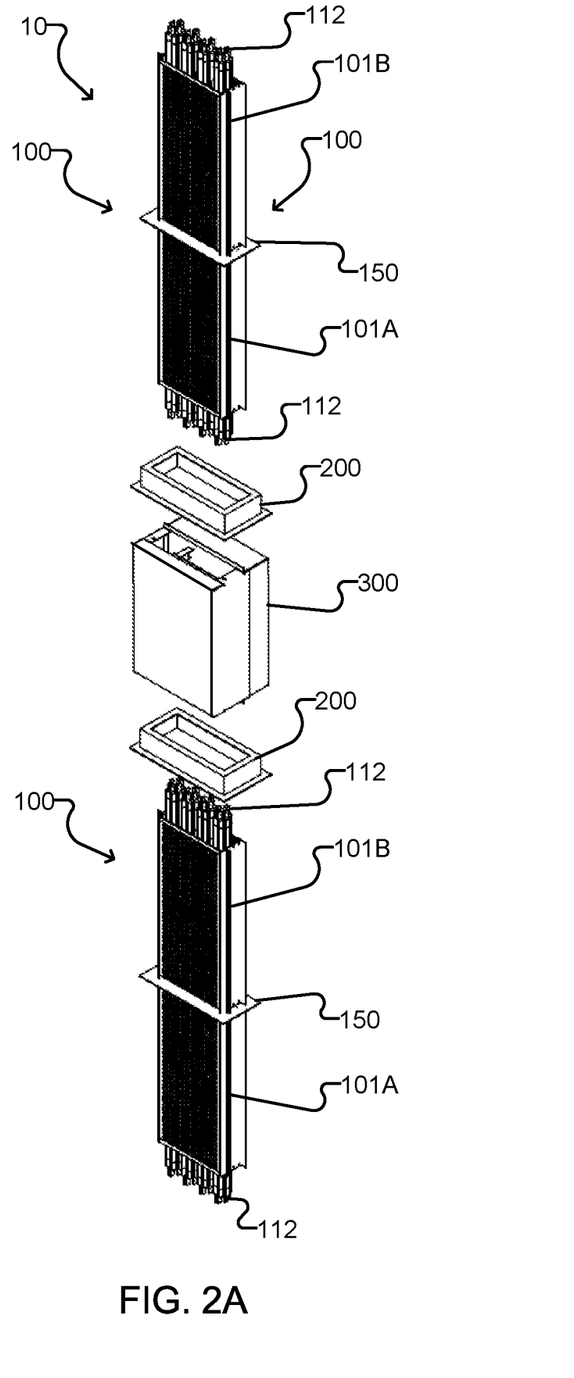
FIG. 2A is an exploded view of the structure of FIG. 1.

FIG. 1 shows a portion of an example electrical power supply structure 10 installed between two floors F1, F2 of a building. FIG. 2 shows the structure 10 of FIG. 1 in isolation, and FIG. 2A is a partially exploded view of the structure 10. Structure 10 comprises a vertical bus section 100 extending through a hole in each floor. Each vertical bus section 100 comprises a lower portion 101A extending below the floor, an upper portion 101B extending upward from the floor, and a barrier support plate 150 between the lower and upper portions 101A and 101B. A spacer block 200 may be provided at each floor and placed between the barrier support plate 150 and the floor to hold the barrier support plate 150 at a predetermined distance above the floor, as discussed further below with reference to FIG. 5. A tap box 300 is provided between adjacent vertical bus sections 100 to provide electrical connections between the conductors thereof, and allow cables or other conductors to connect thereto, as discussed further below with reference to FIGS. 6, 6A, 6B and 6C. In FIG. 2A, the lower one of the spacer blocks 200 is illustrated between the tap box 300 and the lower bus section 100, but it is to be understood that the spacer block 200 would be slid over the lower section of lower bus section 100 such that the barrier support plate 150 of the lower bus section 100 is atop of the spacer block 200.

Figure 3:
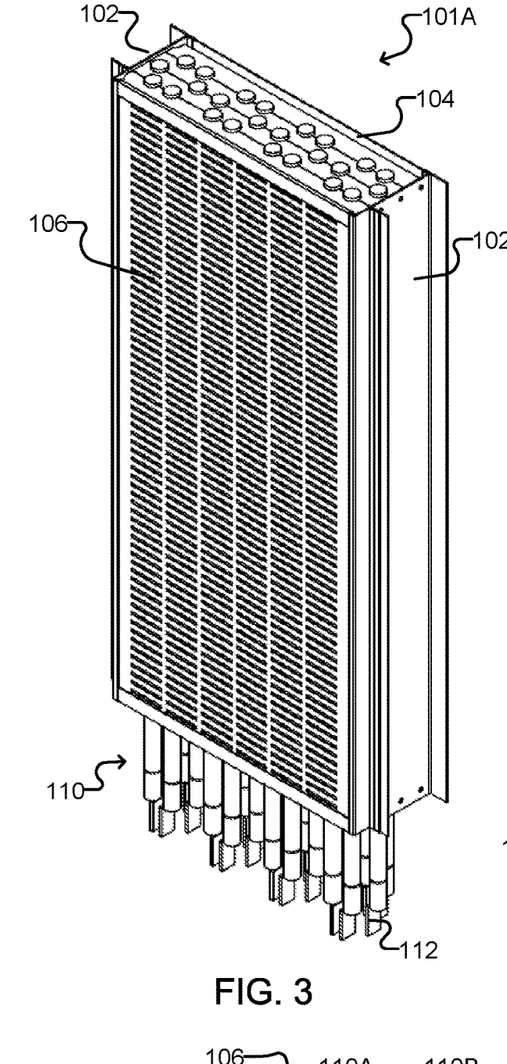
FIG. 3 shows a lower half of an example vertical bus section for the structure of FIG. 1.
Figure 3A:
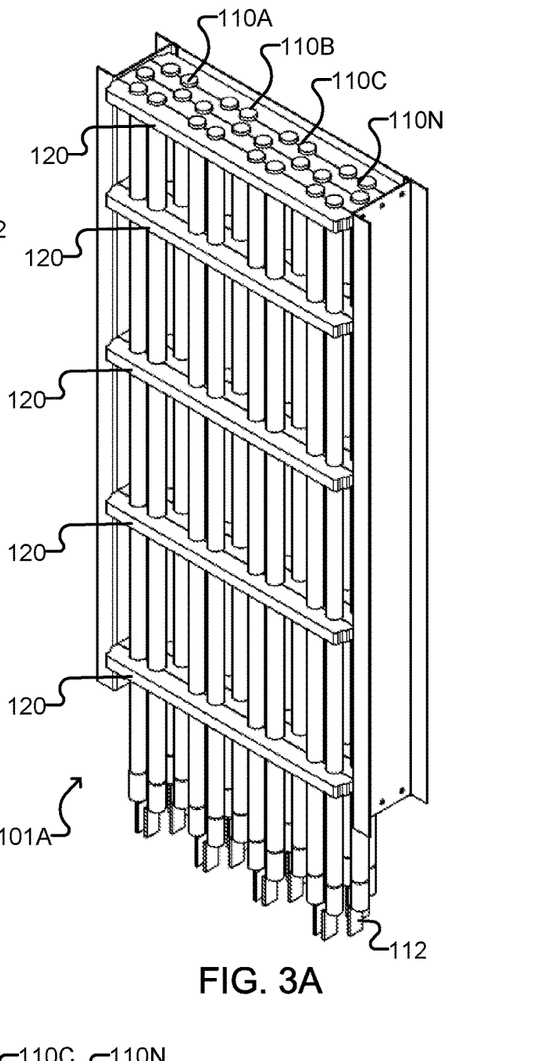
FIG. 3A shows the structure of FIG. 3 with the cover removed.
Figure 3B:
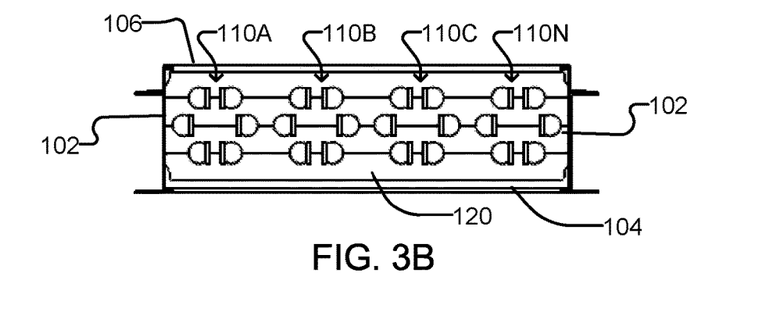
FIG. 3B shows a bottom view of the structure of FIG. 3.

FIG. 3 shows an example lower portion 101A of a vertical bus section 100 for a structure such as structure 10 of FIG. 1. The lower portion 101A comprises a support structure having pair of opposed side rails 102, a back panel 104 extending between the rails 102, and a front cover 106, which form an enclosure for a plurality of conductors 110. As seen in FIGS. 3A and 3B, the conductors are held in place within the lower portion 101A by a plurality of conductor support members 120 extending in a transverse direction between the side rails 102. The cable support members 120 are longitudinally spaced apart along the length of the lower portion 101A. The side rails 102 of each of the lower portion 101A and upper portion 101B of each bus section 100 may be connected to the barrier support plate 150 (not shown in FIGS. 3, 3A, 3B) by a flexible joint.

Figure 2B:
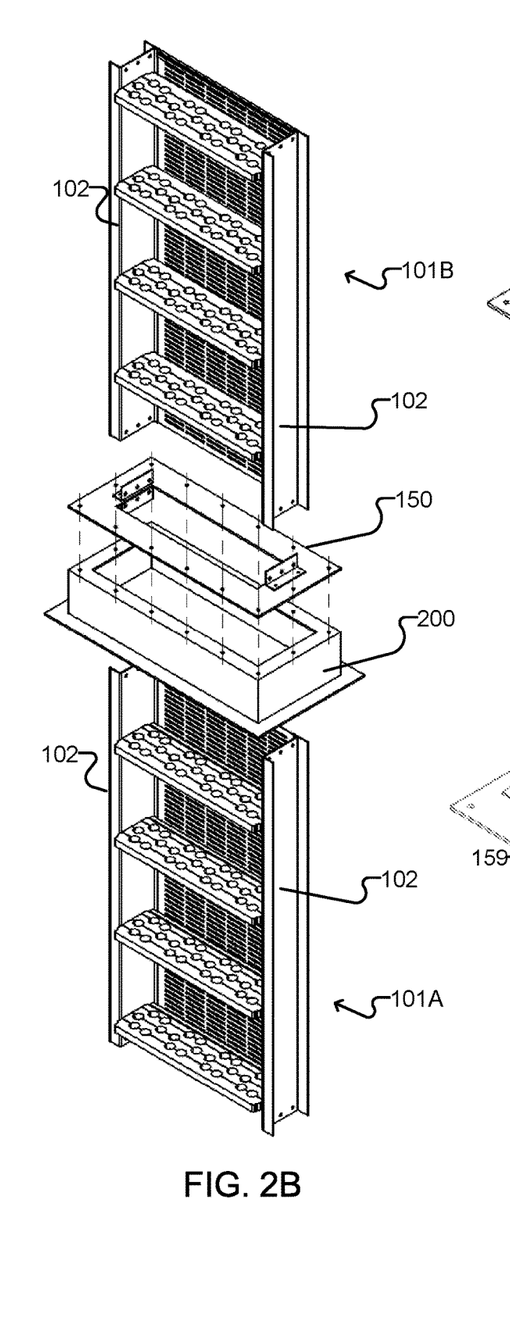
FIG. 2B shows an exploded view of one of the bus sections of the structure of FIG. 1.
Figure 2C:
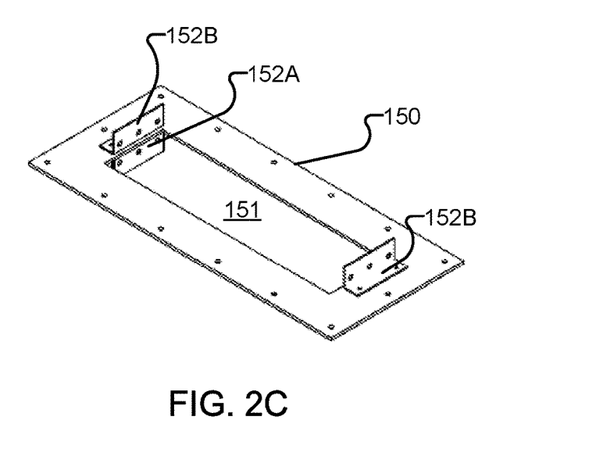
FIG. 2C shows an example barrier support plate of a bus section.

Referring to FIGS. 2B and 2C, in some embodiments the barrier support plate 150 has a central aperture 151 with a pair of lower and upper mounting brackets 152A and 152B on each lateral side of the central aperture 151. The side rails 102 of each of the lower portion 101A and upper portion 101B of each bus section 100 are bolted to the lower and upper mounting brackets 152A and 152B, to provide a degree of flexibility in the connection between side rails 102 and support plate 150.

The upper portion 101B of each bus section 100 is substantially similar to the lower portion 101A. In some embodiments the lower and upper portions 101A and 101B have the same length. In some embodiments the lower and upper portions 101A and 101B have different lengths. In some embodiments the lower and upper portions 101A and 101B are sized so that each tap box 300 is at a predetermined height above each floor. The conductors 110 extend through the length of each bus section 100, and terminate in attachment tabs 112 that are connected to bus bars 310 in the tap boxes 300 as described below.

The conductors 110 are each insulated in some embodiments. The conductors 110 may comprise flexible cables in some embodiments. The conductors 110 may comprise rigid conductors such as pipes or the like in some embodiments. Utilizing pipes for the conductors 110 can advantageously allow a bus section 110 to have a smaller number of conductors 110 for carrying the same current, and fewer support members 120, in comparison to flexible cables, which may result in reduced cost. In embodiments using rigid conductors 110 such as pipes, flexible members such as for example metal braids are provided between conductors and bus bars 310 to accommodate expansion and contraction of conductors 110.

Figure 2D:
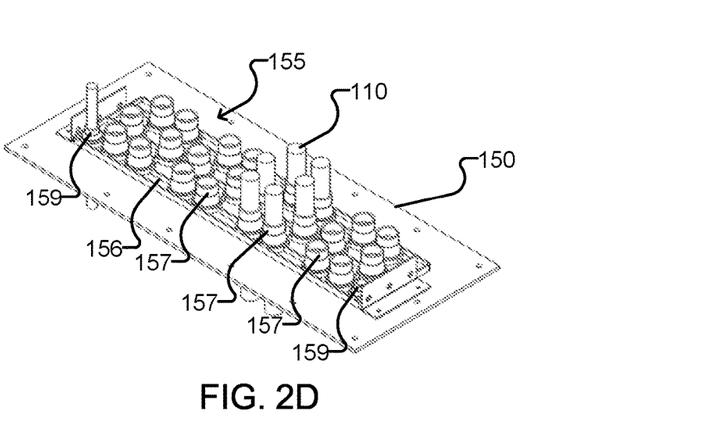
FIG. 2D shows an example sealing system for a barrier support plate.

The conductors 110 are preferably continuous throughout the whole length of a bus section 100, and extend between the lower and upper portions 101A and 101B through one or more apertures in the barrier support plate 150. A sealing system is preferably provided around the apertures through the barrier support plate 150 to provide a water tight seal around the conductors 110. FIG. 2D shows a support plate 150 with an example sealing system 155. The sealing system 155 comprises a sealing barrier 156 across the central aperture 151. The sealing barrier 156 has a plurality of holes therethough with a sealing sleeve 157 around each hole. In the FIG. 2D example, only one phase of conductors 110 is shown inserted through the holes and held within the sealing sleeves 157. The FIG. 2D example also includes smaller holes and associated sleeves 159 for receiving grounding cables (only one of which is shown). Each of the conductors 110 terminate in an attachment tab 112 at the lower end of the lower portion 101A, and another attachment tab 112 at the upper end of the upper portion 101B. In the illustrated embodiment, the conductors 110 have generally circular cross section.

In the example illustrated in FIGS. 3, 3A, 3B, the conductors 110 are configured to deliver three phase grounded electrical power, and are grouped by phase. The conductors of each group of first phase conductors 110A, second phase conductors 110B, third phase conductors 110C and neutral conductors 110N are arranged in a generally circular arrangement, as best seen in FIG. 3B. Such a circular arrangement facilitates connection of the attachment tabs 112 to the tap boxes 300, as described below. Also such a circular arrangement provides improved force cancelation between the three electrical phase groups of conductors 110 and the neutral group as opposed to other shapes.

Figure 4:
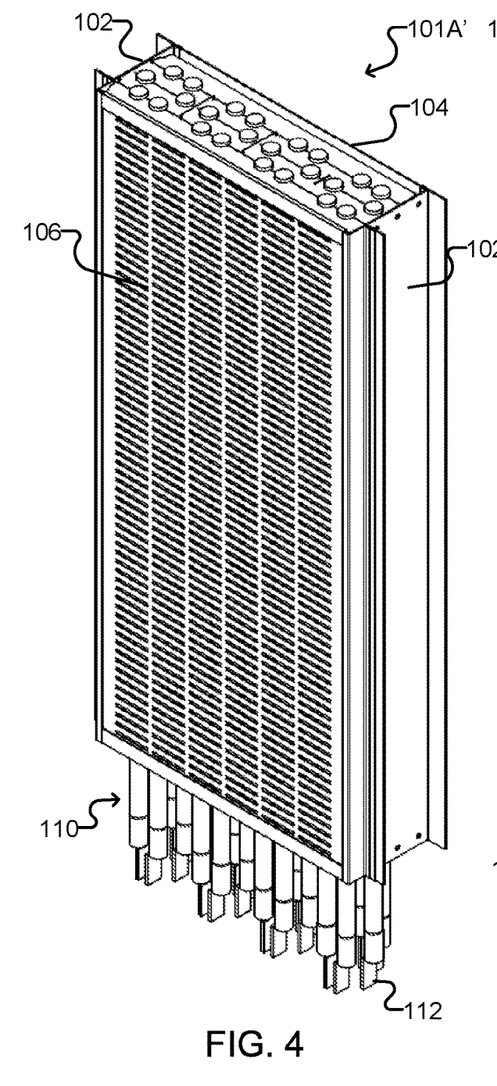
FIG. 4 shows a lower half of another example vertical bus section for the structure of FIG. 1.
Figure 4A:
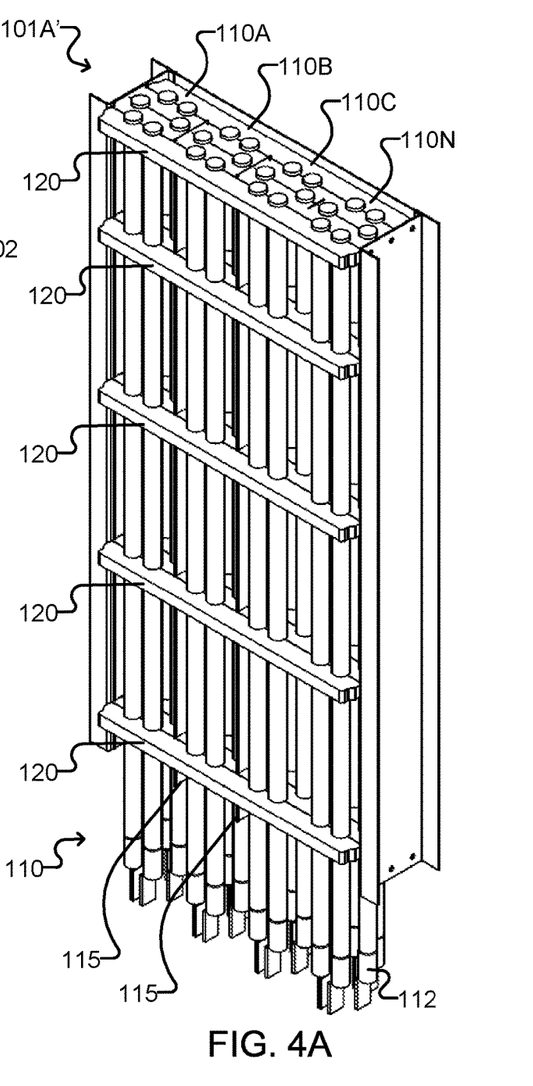
FIG. 4A shows the structure of FIG. 4 with the cover removed.
Figure 4B:
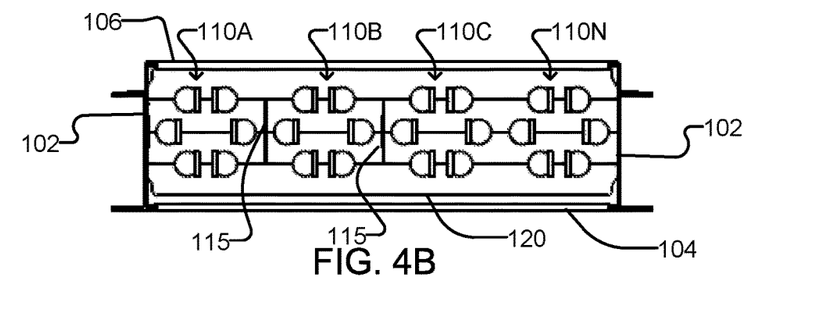
FIG. 4B shows a bottom view of the structure of FIG. 4.

In some embodiments, the bus sections 100 may comprise shielding. FIGS. 4, 4A and 4B show an example lower portion 101A' of a vertical bus section 100 that includes shielding. The example of FIGS. 4, 4A and 4B is otherwise the same as the example of FIGS. 3, 3A and 3B. In the illustrated example, a shield plate 115 is provided between the first phase conductors 110A and the second phase conductors 110B, and another shield plate 115 is provided between the second phase conductors 110B and the third phase conductors 110C. The shield plates 115 extend continuously throughout the lower portion 101A', through slots in the cable support members 120. As best seen in FIG. 4B, the shield plates 115 do not extend the full depth between the back panel 104 and cover 106. The shield plates 115 may be constructed from steel or aluminum in some embodiments. The thickness of the shield plates 115 may be selected based on forces and eddy currents on each electrical phase group and neutral group of conductors 110. In some embodiments, shield plates 115 have a thickness of about 0.040" (0.1 cm).

Figure 5:
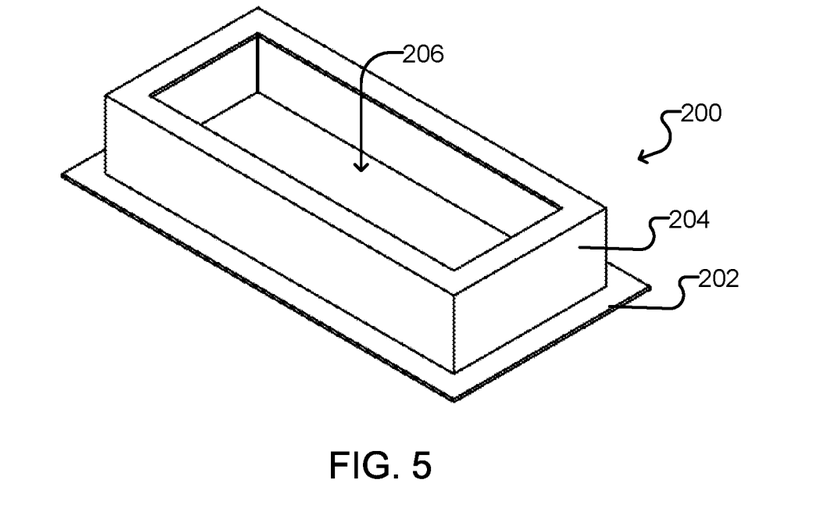
FIG. 5 shows an example spacer block for the structure of FIG. 1.

FIG. 5 shows an example spacer block 200 for a structure such as structure 10 of FIG. 1. The spacer block 200 comprises a flange 202 and a riser 204 with an aperture 206 therethrough. The aperture 206 is sized and shaped such that the lower portion 101A of a bus section 100 is snugly received therein. In some embodiments, the spacer block 200 is constructed from steel or stainless steel. In some embodiments, the spacer block 200 may have fire retarding materials therewithin.

Figure 6:
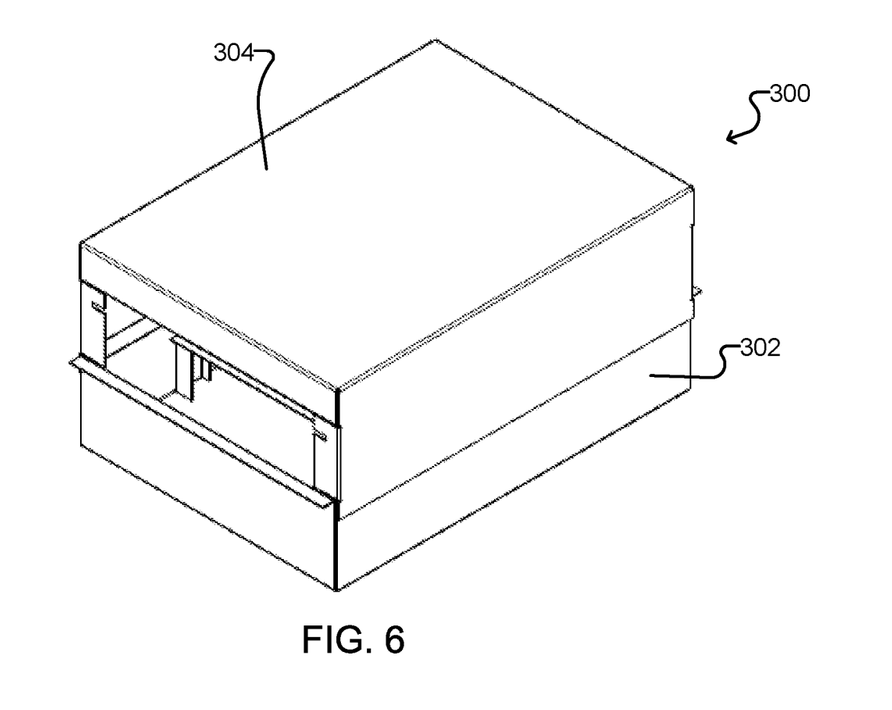
FIG. 6 shows an example tap box for the structure of FIG. 1.
Figure 6A:
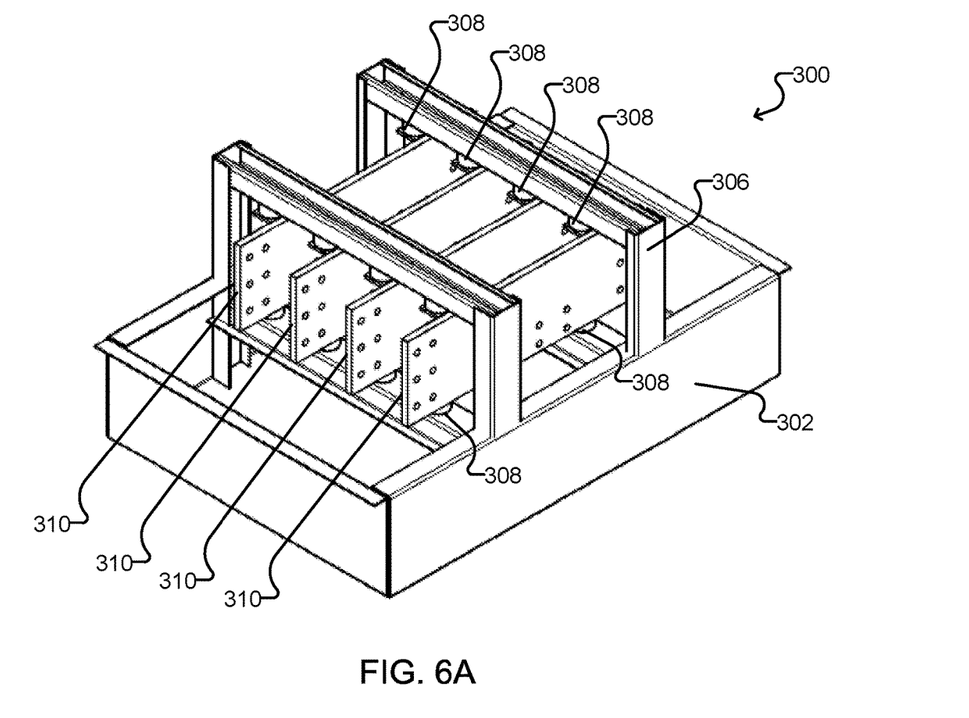
FIG. 6A shows the tap box of FIG. 6 with the cover removed.
Figure 6B:
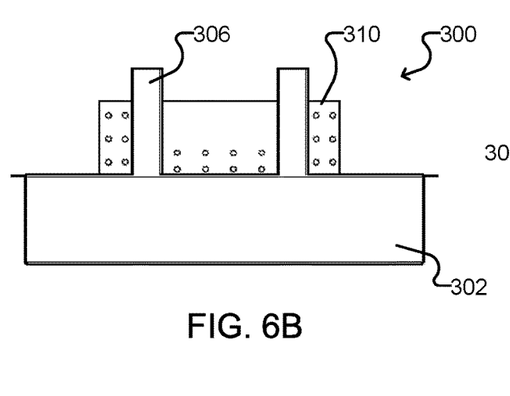
FIG. 6B is a side view of the tap box of FIG. 6A.
Figure 6C:
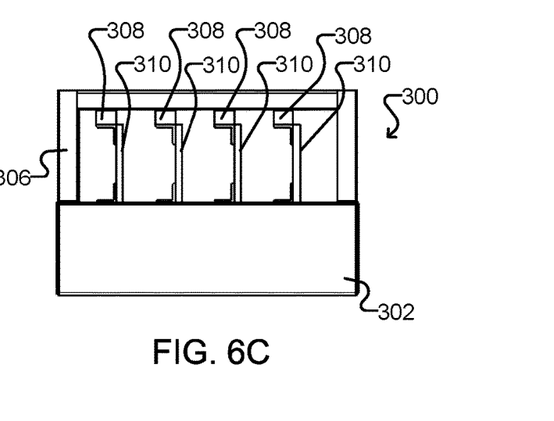
FIG. 6C is a bottom view of the tap box of FIG. 6A.
Figure 6D:
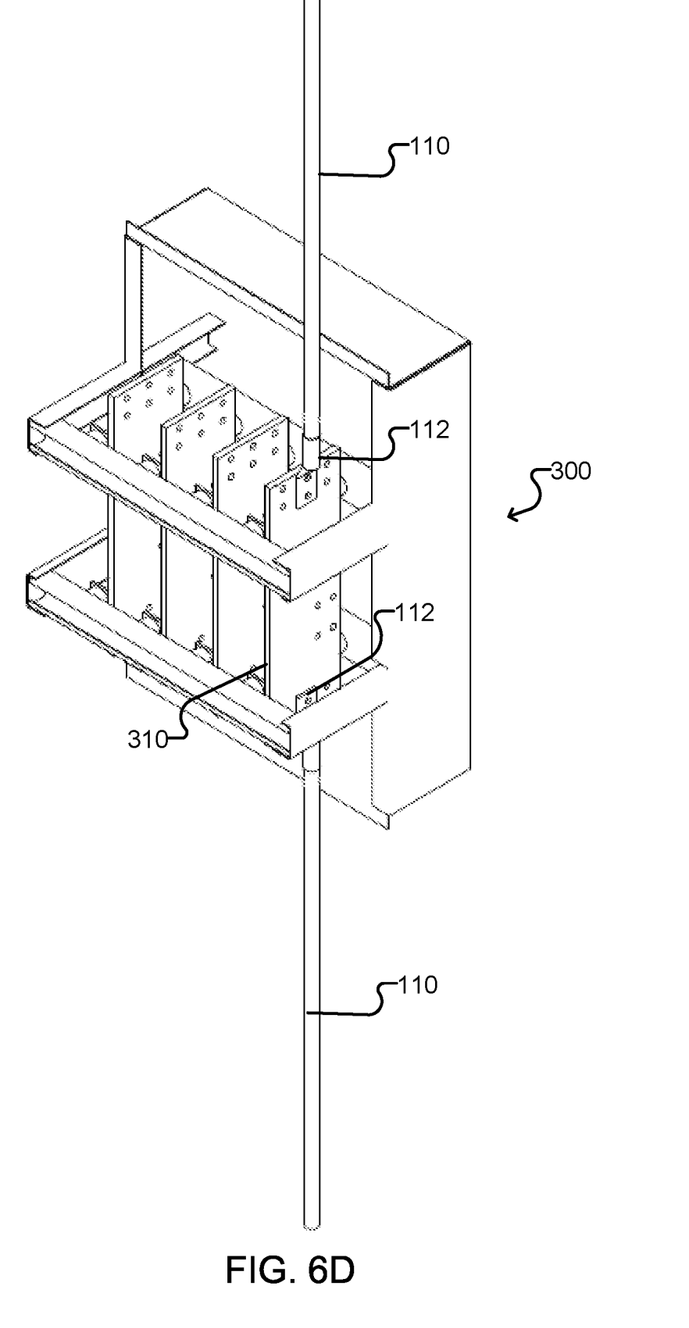
FIG. 6D shows a single conductor connected to a bus bar of a tap box.

FIG. 6 shows an example tap box 300 for a structure such as structure 10 of FIG. 1. The tap box 300 comprises a base 302 and a cover 304. An opening between the base 302 and the cover 304 is provided on each of the top and the bottom for receiving the end of a bus section 100. As seen in FIGS. 6A, 6B and 6C, support brackets 306 extend from the base 302, and bus bars 310 are attached to the support brackets 306 through insulating connectors 308. The bus bars 310 have holes at either end to facilitate connection of the attachment tabs 112 of the conductors 110 thereto. FIG. 6D shows a single conductor connected to each end of the bus bar 310 by means of an attachment tab 112. The bus bars 310 may also each have a plurality of holes therethrough to facilitate connection of cables for power distribution from the tap box 300. In some embodiment, the tap box 300 has partially cut holes or "knockouts" around the periphery of the base 302.

Figure 7:
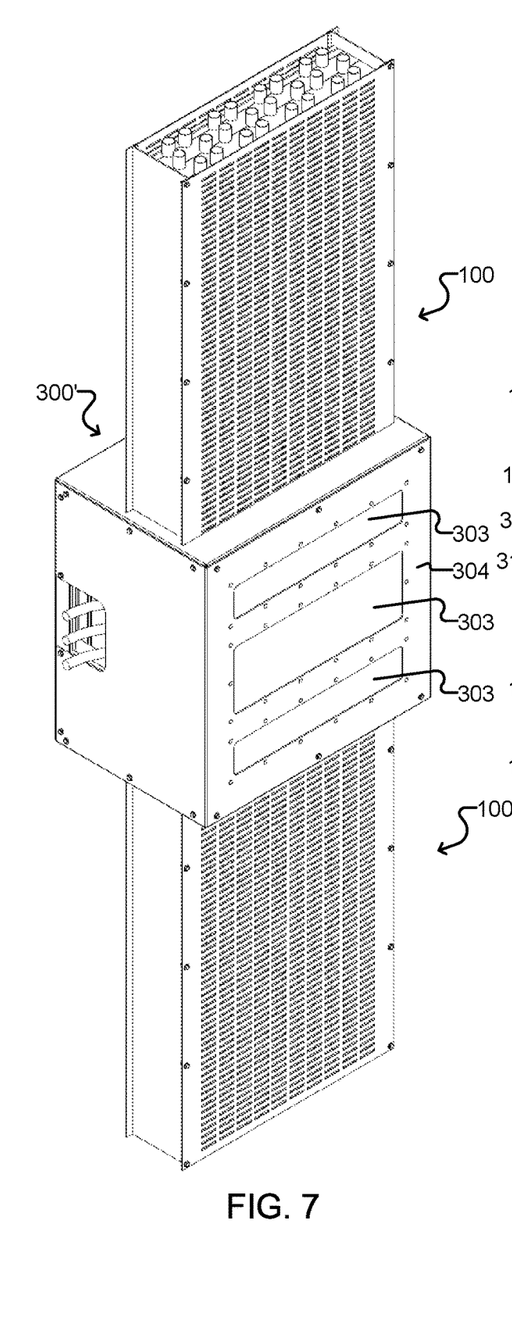
FIG. 7 shows a tap box according to another embodiment of the present disclosure connected between two bus sections.
Figure 7A:
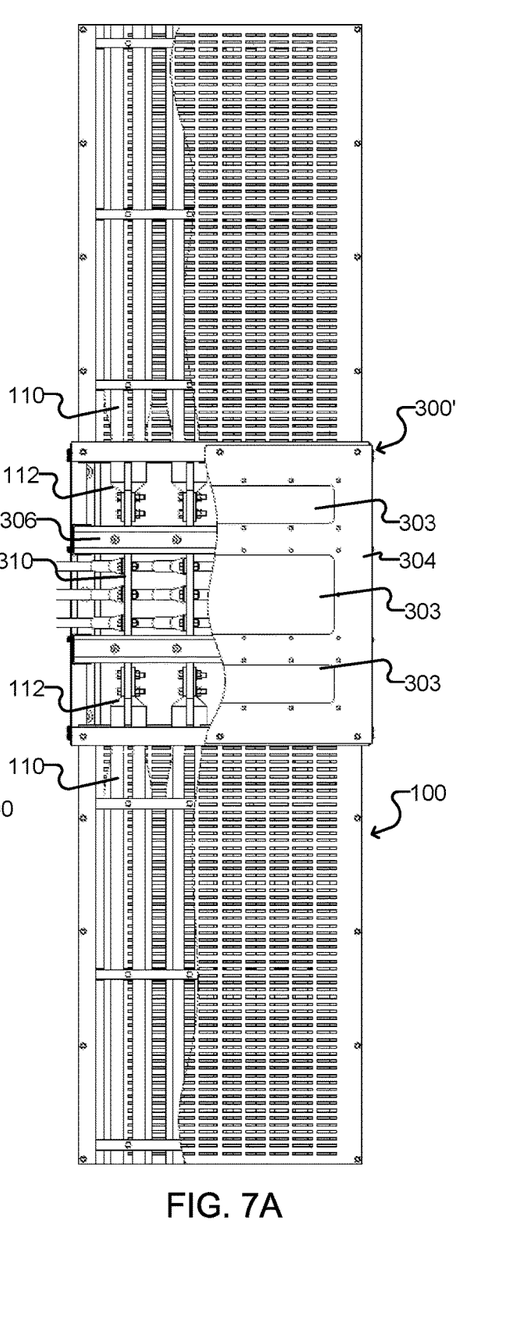
FIG. 7A shows the tap box and bus sections of FIG. 7 with portions of their covers cut away.

FIGS. 7 and 7A show a tap box 300' according to another embodiment. Tap box 300' has a plurality of infrared (IR) windows 303 in its cover 304. IR windows 303 facilitate inspection of the internal connections of the tap box 300' without removing cover 304 by allowing thermal imaging of the connections to the bus bars 310.

The present disclosure may be embodied in other specific forms without departing from its spirit or essential characteristics. The described embodiments are to be considered in all respects only as illustrative and not restrictive.

The invention claimed is:

1. An electrical power supply structure comprising:
 a plurality of insulated pipes, each insulated pipe extending longitudinally and configured to carry high amperage electrical power;
 a barrier support plate comprising one or more openings for receiving the plurality of insulated pipes, the barrier support plate configured for mounting over a hole through a floor of a building;
 a first support structure extending longitudinally upward from an upper side of the barrier support plate; and,
 a second support structure extending longitudinally downward from a lower side of the barrier support plate through the hole,
 wherein each of the first and second support structures comprises a longitudinally extending enclosure having a plurality of transversely extending conductor support members for supporting the plurality of insulated pipes, and
 wherein the plurality of insulated pipes are grouped by phase.

2. The electrical power supply structure of claim 1 comprising a spacer block having an opening sized to fit an outer dimension of one of the first and second support structures and configured to be mounted between the barrier support plate and a floor of a building such that the barrier support plate is held at a predetermined height above the floor.

3. The electrical power supply structure of claim 1 wherein the insulated pipes in each group are arranged in a circular arrangement.

4. The electrical power supply structure of claim 1 comprising shielding between groups of insulated pipes of different phases.

5. An electrical power distribution system for a high-rise building with a plurality of floors, the system comprising:
 a plurality of electrical power supply structures arranged in a vertical stack, each electrical power supply structure comprising a plurality of insulated pipes extending longitudinally and configured to carry high amperage electrical power, a barrier support plate comprising one or more openings for receiving the plurality of insulated pipes, a first support structure extending longitudinally from a first side of the barrier support plate, and a second support structure extending longitudinally from a second side of the barrier support plate, each of the first and second support structures comprising a longitudinally extending enclosure having a plurality of transversely extending conductor support members for supporting the plurality of insulated pipes, wherein the plurality of insulated pipes are grouped by phase; and a plurality of tap boxes for connecting the plurality of electrical supply structures, each tap box connected between two adjacent electrical power supply structures and comprising a bus bar for each phase of electrical power, the bus bar having a first end for connecting the insulated pipes carrying that phase of electrical power in an upper one of the two adjacent electrical power supply structures, and a second end for connecting to the insulated pipes carrying that phase of electrical power in a lower one of the two adjacent electrical power supply structures.

6. The electrical power distribution system of claim 5 wherein a length of each of the first and second support structures of each of the electrical power supply structures is selected such that each of the tap boxes is positioned at a predetermined height above one of the plurality of floors of the high-rise building.

7. The electrical power distribution system of claim 5 wherein the insulated pipes in each group are arranged in a circular arrangement.

8. The electrical power distribution system of claim 5 comprising shielding between groups of insulated conductors of different phases.

9. The electrical power distribution system of claim 5 wherein each electrical power supply structure comprises a spacer block having an opening sized to fit an outer dimension of one of the first and second support structures and configured to be mounted between the barrier support plate and a floor of the high-rise building.

10. A vertical bus for delivering high amperage electrical power, the vertical bus comprising:

a supporting structure extending in a longitudinal direction, the supporting structure defining an enclosure;

one or more shielding members extending within the supporting structure in the longitudinal direction and dividing the enclosure into two or more longitudinal chambers;

a plurality of conductor support members extending in a transverse direction across the supporting structure, the plurality of conductor support members being longitudinally spaced apart along a length of the supporting structure, and each cable support member comprising a plurality of holders arranged in a plurality of groups, each group located within one of the longitudinal chambers, such that the conductor support members support insulated pipes carrying multiphase electrical power and comprising a plurality of insulated pipes for each phase of electrical power.

\* \* \* \* \*